Nov. 15, 1966 W. B. LANE 3,286,095
ZINC BROMIDE RADIATION-SHIELDING WINDOW MAINTAINED
UNDER AN INERT GAS ATMOSPHERE
Filed Sept. 30, 1963 3 Sheets-Sheet 1

INVENTOR.
WILLIAM B. LANE

ATTORNEYS

Nov. 15, 1966

W. B. LANE 3,286,095

ZINC BROMIDE RADIATION-SHIELDING WINDOW MAINTAINED
UNDER AN INERT GAS ATMOSPHERE

Filed Sept. 30, 1963

INVENTOR.
WILLIAM B. LANE

ATTORNEYS

INVENTOR.
WILLIAM B. LANE
BY
ATTORNEYS

United States Patent Office 3,286,095
Patented Nov. 15, 1966

3,286,095
ZINC BROMIDE RADIATION-SHIELDING WINDOW MAINTAINED UNDER AN INERT GAS ATMOSPHERE
William B. Lane, Los Gatos, Calif., assignor to the United States of America as represented by the Secretary of the Navy
Filed Sept. 30, 1963, Ser. No. 312,803
2 Claims. (Cl. 250—108)

The invention described herein may be manufactured and used by or for the Government of the United States of America for governmental purposes without the payment of any royalties thereon or therefor.

The present invention relates to radiation-shielding window and, more particularly, to an improved "zinc bromide" radiation-shielding window which maintains its optical transparency for such uses as permitting external viewing of the interior of a "hot cell" such as is necessary for remote-controlled manipulation of radioactive materials within the "hot cell."

The problem of meeting the twofold need of being able to clearly see into a "hot cell" containing radioactive material and yet being biologically shielded from the radiation present in the hot cell has been met by the employment of what generally is referred to as a "zinc bromide" window. The pertinent wall of the hot cell is formed with an opening therethrough which accommodates a tank-like enclosure whose respective front and rear walls are sheets of transparent glass. The balance of the tank-like enclosure generally is constructed of steel and this tank-like enclosure is filled with an optical grade zinc bromide solution. This zinc bromide solution present in the tank-like enclosure is a clear transparent liquid which permits easy viewing therethrough and, in conjunction with the front and rear glass walls of the enclosure, permits external viewing of the interior of the "hot cell." The zinc bromide solution also serves as a radiation absorbing medium to confer the necessary biological shielding to the viewer looking through the "window."

Previous zinc bromide solution shielding windows have a serious disadvantage in that the zinc bromide solution of the shielding window tends to become contaminated, in which instance it assumes a brownish color which progressively destroys the operative transparency of the solution and the ability to see into the hot cell via the shielding window. The loss of transparency in the shielding window is not an easily correctable matter. It involves replacement of the contaminated zinc bromide solution of the window, which, in turn, requires that the hot cell be taken out of operation and allowed to "cool off" so that the zinc bromide solution of the shielding window can be replaced without the risk of radiation contamination to the personnel involved. The amount of time required for such a hot cell to be inoperative in order that the radiation assume a low enough level so as to permit the shielding window replacement can run up to a year in length. With each hot cell running on the order of a half million dollars in representative dollar value, it can be seen that the loss of time involved in the replacement of the contamination-discolored zinc bromide solution of the shielding window is a matter of some significance.

A principal cause of the contamination which destroys the indispensable transparency of the zinc bromide solution of the shielding window is the interaction between the zinc bromide and the metal tank-like enclosure which contains the zinc bromide solution. Heavy metal ions or precipitates cause discoloration in zinc bromide. The tank-like enclosure for the zinc bromide solution is generally constructed of steel and, when it was recognized that the metal of the enclosure was causing contamination of the zinc bromide solution, attempts were made to ward off this contamination by painting over the solution-exposed portions of the metal enclosure. This expedient did not answer the problem because the zinc bromide still continued to become contaminated, either by direct reaction with the "protecting" paint or by reaction with the underlying steel surface after the paint had been corroded away. Another attempt to meet this contamination problem is illustrated by the U.S. Patent No. 3,045,120 to C. H. Ohrn. Ohrn's approach to the problem was to substitute, through the use of a copper liner member for the shielding window, copper surfaces for the steel surfaces which were to be exposed to the zinc bromide solution. Though this approach may have ameliorated the contamination situation somewhat, it still does not provide an effective answer. Copper also reacts with the zinc bromide solution in the Ohrn shielding window to produce contamination of the zinc bromide solution. Moreover, the introduction of the copper liner produces its own problems. One of these is that the cost of the shielding window is significantly multiplied (i.e. by orders of magnitude). The other difficulty traceable to the use of the copper liner is that possible radiation leakage paths between the copper liner and the steel shell or supporting members are produced which can materially weaken the shielding obtained with the given shielding window.

In its essence, the present invention solves the chemically-induced contamination of the zinc bromide solution (of the shielding window) which has been described above, not by resort to a particular metal for the container surfaces which are exposed to the zinc bromide solution, nor by the (ineffective) use of protective coatings to cover the zinc-bromide-solution-exposed surfaces of the tank-like enclosure, but by a singularly different approach which involves placing the metal surfaces which are to be exposed to the zinc bromide solution under an inert gas atmosphere, rather than under the normal oxygen-containing air atmosphere previously employed with such zinc bromide solution radiation-shielding windows. The result is a vastly improved zinc bromide shielding window characterized by a greatly extended useful life, by lower initial cost, and by a requirement for less maintenance than the previously-existing zinc bromide shielding windows.

Among objects of importance of the present invention are:

To provide an improved zinc bromide-filled shielding window for use with hot cells.

To provide a zinc bromide-filled shielding window for hot cell use wherein the effective transparency of the zinc bromide solution is preserved.

To provide a zinc bromide-filled radiation-shielding window wherein the zinc bromide solution is substantially immune to the type of contamination that destroys the transparency of the zinc bromide solution and therefore the ability to see clearly through the given radiation-shielding window.

To provide a zinc bromide-filled, radiation-shielding window adapted for use with a hot cell and which is substantially immune to contamination of the zinc bromide from both chemical interactions and radiation effects.

Other objects and many of the attendant advantages of this invention will be readily appreciated as the same becomes better understood by reference to the following detailed description when considered in conjunction with the accompanying drawings in which.

Figure 1:
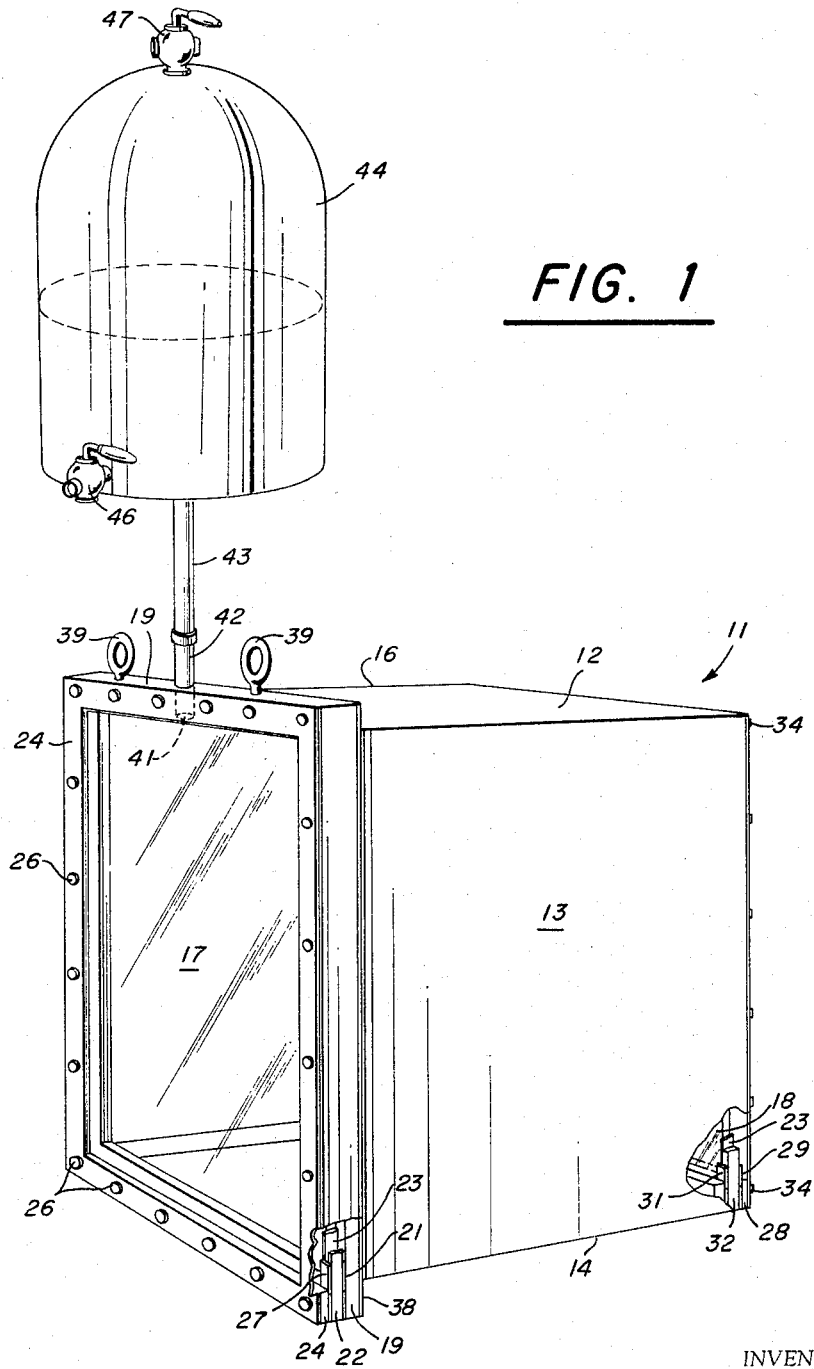
FIG. 1 is a perspective view of the radiation shielding window of the invention along with its expansion tank.

Referring now to the drawing, the radiation-shielding window of this invention is generally designated by the numeral 11. This radiation shielding window 11 is intended for use as a window in a hot cell or like structure for the dual purpose of permitting visual observation into the hot cell, while at the same time affording, to the observer, the necessary biological shielding. A hot cell is essentially a concrete cubicle with walls several feet thick to attenuate gamma radiation. Many hot cell procedures correspond to those performed in a chemical laboratory or machine shop. The manual dexterity that is required in the laboratory or on the machinist's bench is made possible through the use of master-slave manipulators. Use of these master-slave manipulators requires crucial observation into the hot cell. Ideally, a viewing system for such remote manipulation, such as the radiation-shielding window, should give the same visual impression from the remote operating position as would be obtained while working at arm's length. At the same time, the shielding window, in addition to providing adequate viewing into the hot cell, also must afford sufficient biological shielding. Windows filled with zinc bromide solution give an image sufficiently free of distortion and other optical defects to allow the use of standard or commercially available tools and apparatus in the hot cell. Sufficient resolution is possible with a so-called zinc bromide window as to permit nearly-normal operator-equipment orientation. While zinc bromide is not an ideal window material, its advantages vastly outweigh its disadvantages for this type application. Shielding properties of a 77% solution of zinc bromide (which has a density of 2.5) are equivalent to that of concrete, permitting hot cell walls with windows of the same thickness. The refractive index (1.56) of this concentrated solution gives a wide field of view in the hot cell.

Looking now to the specific structure of the improved zinc bromide shielding window seen in the various figures of the drawing, the shielding window is principally the combination of the tank-like enclosure which holds the optically-transparent zinc bromide solution and which has oppositely-disposed ends consisting of glass plates and the transparent zinc bromide solution therein. This zinc bromide shielding window is adapted to fit in a flush manner into the opening formed in the hot cell so that observation can be had into the hot cell via two glass plates and the intervening transparent zinc bromide solution. The main portion of the tank-like enclosure is formed of a group of longitudinally extending walls 12, 13, 14 and 16 as seen in FIG. 1. These walls which are secured together by any appropriate method as, for example, by welding can be formed of an appropriate material such as carbon steel, which is characterized by low cost and favorable structural properties. At the longitudinal ends of the window the main members are a pair of respective sheets of glass 17 and 18. In the assembled embodiment these glass sheets 17 and 18 will be substantially parallel to one another. These glass sheets 17 and 18 are formed of a special glass that is stable against dislocation when subjected to large amounts of radiation. Such non-browning glass is commercially available under a variety of trade names. In addition to their non-discoloring properties, these glass sheets 17 and 18 must be thick enough to withstand the pressure exerted upon them by the zinc bromide solution when the enclosure of which they are a part is filled with this zinc bromide solution. As can be deduced from the density figure previously noted, this zinc bromide solution is a relatively heavy liquid.

The respective glass sheets 17 and 18 are in sealing relationship with each of the longitudinally extending walls 12, 13, 14 and 16. At the observer-end of the shielding window 11 the four-sided member, formed by the respective walls 12, 13, 14 and 16, is formed with an integrally-formed laterally-extending portion 19. The window glass sheet 17 and its ancillary structure is fastened up against this laterally extending portion 19. Glass sheet 17 is placed up against this laterally-extending portion 19 with an intervening sealing gasket 21 located at all points between the otherwise-contacting portions of the glass sheet 17 and the laterally-extending portion 19. Sealing gasket 21 can be made of any suitable material which is resistant to the zinc bromide solution and will otherwise provide an appropriate sealing action. In the particular embodiment found herein sealing gasket 21 was made of "Koroseal" which is a synthetic rubber product sold by the B. F. Goodrich Company. Glass sheet 17 is peripherally surrounded by a spacer 22 which may be made of steel. This peripherally surrounding spacer 22 is somewhat separated from glass sheet 17 and in the intervening space there is located a packing strip 23 also formed of a synthetic rubber, such as Koroseal, which is resistant to the zinc bromide solution and which performs both a sealing and cushioning action. Outwardly of glass sheet 17 is a frame member 24 which can be formed of steel or some like material and which functions to hold glass sheet 17 firmly in place. A plurality of metal screws 26 are screwed through this frame member 24 and then through spacer 22 to penetrate and anchor in the laterally extending portion 19. With these metal screws 26 seated into place until their respective heads abut the outer portion of the frame member 24, the aforedescribed assembly is held in operative position to hold glass sheet 17 in firm sealing position with respect to the respective longitudinally extending walls 12, 13, 14 and 16. Between the frame member 24 and glass sheet 17 there is also positioned an appropriate sealing gasket 27 which likewise performs a sealing and cushioning function and which is formed of a suitable synthetic rubber resistive to the chemical effect of the zinc bromide solution, such as Koroseal. Spacer 22 serves to keep frame member 24 from exerting too much pressure on glass sheet 17 and packing strip 23 prevents spacer 22 from exerting undue lateral force on the glass sheet 17.

The hot-cell-end glass sheet 18 is secured in like fashion to the hot-cell-ends of the longitudinally-extending walls 12, 13, 14 and 16 and involved is the use of outer frame member 28, a pair of gaskets 29 and 31, the spacer 32, a packing strip 23 and a plurality of metal screws 34 as shown. All of the elements just mentioned are positioned as and function as do their like elements for the observer-end glass sheet 17 assembly, described above. It will be noted that the hot-cell-ends of the respective longitudinally extending walls 12, 13, 14, and 16 are not provided with a laterally extending portion such as laterally-extending portion 19 which characterized the observer-end of said longitudinally-extending walls. The reason for this difference in the shape of the respective longitudinal ends of the tank-like enclosure which holds the zinc bromide solution will be discussed later when the shielding window is related to the hot cell wall in which it fits. The respective longitudinally-extending walls 12, 13, 14 and 16 are each of sufficient thickness to provide abutting structure against which the glass sheet 18 and its associated structure can rest and to which the assembly composed thereof can be firmly secured so as to provide the necessary sealing relationship between the glass sheet 18 and the balance of the tank-like enclosure.

Shielding window 11 is adapted to be placed into a complementarily shaped opening in the wall of the hot cell. In the particular embodiment portrayed herein it will be noted that the vertically-extending longitudinal walls 13 and 16 of the shielding window 11 taper inwardly as they go from the observer-end to the hot-cell-end of the window 11. The opening in the hot cell wall is complementarily shaped and the result of the use of sloping walls, such as described, is to facilitate the insertion and extraction of the shielding window respectively into and from the opening in the hot cell wall.

Figure 2:
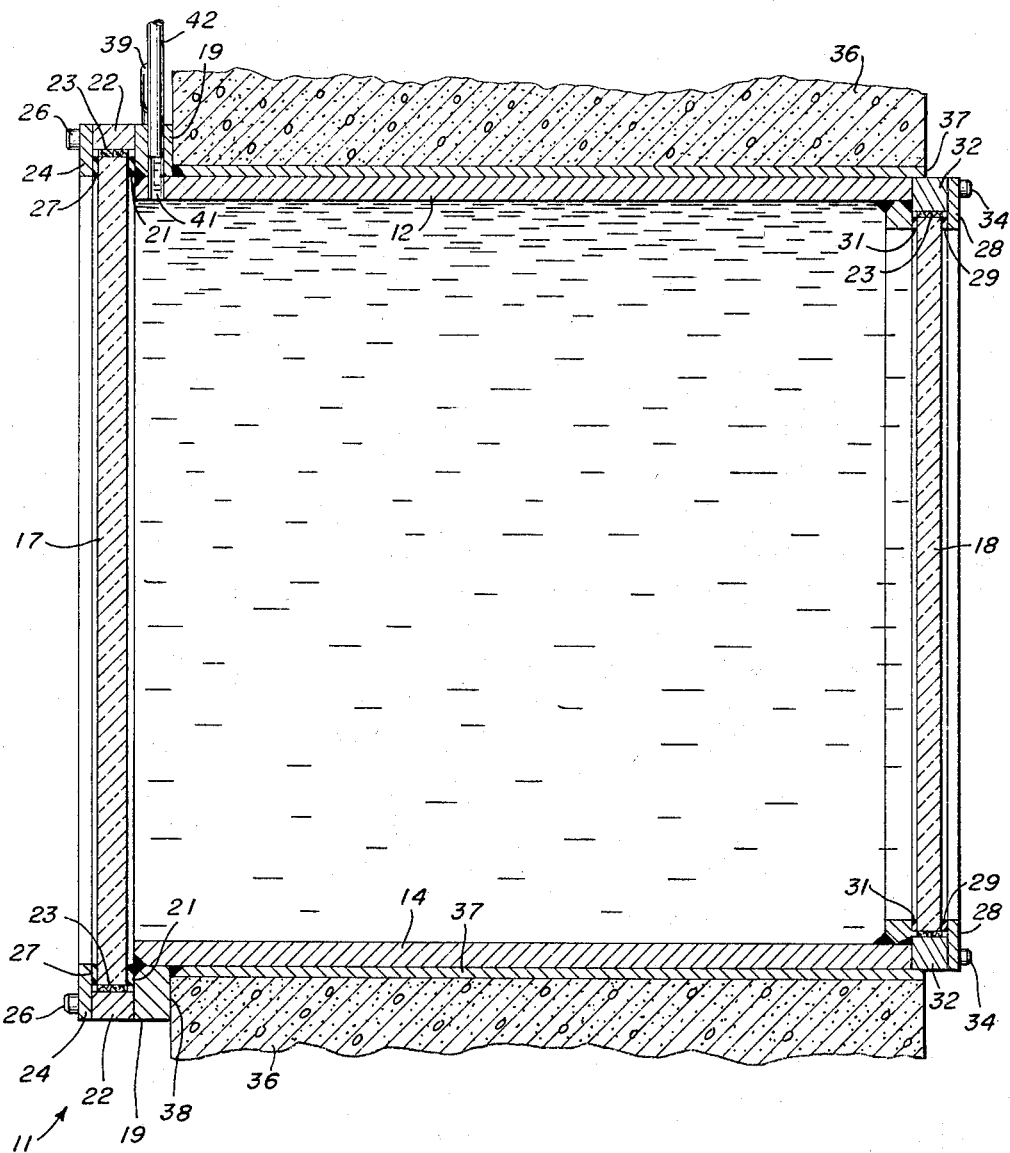
FIG. 2 is a sectional view in elevation of the subject shielding window fitted into a hot cell wall.
Figure 3:
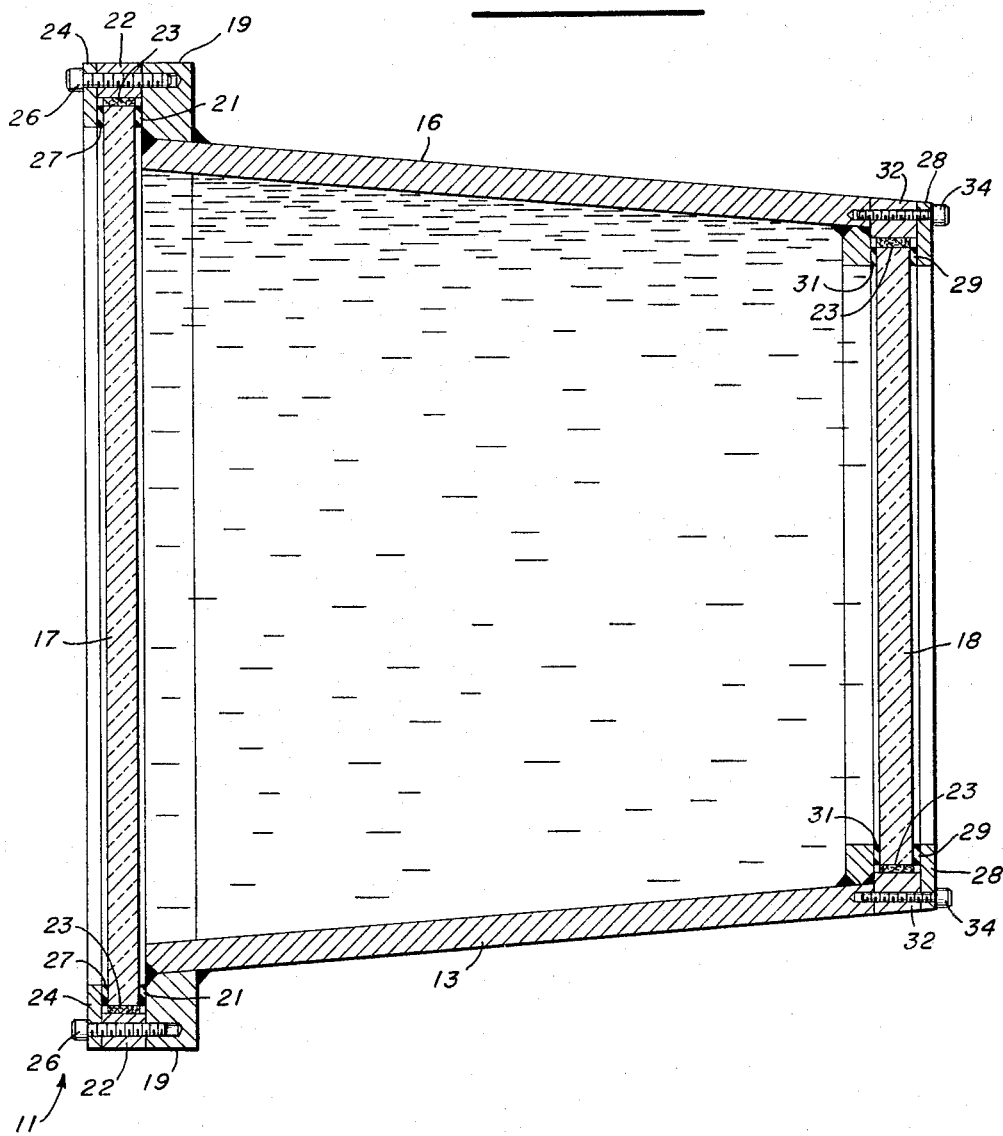
FIG. 3 is a horizontal sectional view of the shielding window.

Looking now especially in FIG. 2 which portrays the radiation-shielding window 11 in operative position in the opening in the hot cell wall, the hot cell wall is designated by the numeral 36. Between the shielding window 11 and the hot cell wall 36 there is a caulking material 37 which provides a seal between the wall 36 and the shielding window 11. This caulking material can be of any appropriate substance such as lead wool, for example, that is impervious to the radioactivity of the radioactive material(s) within the hot cell. When the shielding window 11 is an operative seated position in the hot cell well opening the inner edge 38 of the laterally-extending portion 19 will be flush with the adjacent outside wall structure. With the shielding window in this operative position, the laterally extending portion 19 thereof presents a shielding obstacle to any leakage radiation which might proceed via the interface between the caulking material 37 and the shielding window 11 or by way of the interface between the caulking material 37 and the adjacent hot cell wall.

The shielding window 11 is provided with a pair of lifting eye bolts 39, mounted as shown, which enable physical lifting of the shielding window.

The laterally-extending portion 19 of the shielding window 11 is formed at its upper end with a hole 41 therethrough which accommodates, in a fluid-tight joint, a black iron pipe 42 which is adapted to connect to another black iron pipe 43 which leads to an expansion tank 44. Expansion tank 44 is fitted at its lower portion with a stopcock 46, as shown, and at its uppermost portion with another stopcock 47, as shown. By means of pipes 42 and 43 this expansion tank 44 is in fluid communication with the interior of the shielding window enclosure. The shielding window 11, when in operation, will be completely filled with the zinc bromide solution and this same zinc bromide solution will also be present in pipes 42 and 43 and in the expansion tank 44 to the level as indicated therein in the drawing. Expansion tank 44 permits expansion of the zinc bromide solution within the confines of the tank-like enclosure of the shielding window. Absent such an expansion tank 44, the zinc bromide solution within the shielding window 11 would, upon normal expansion thereof (such as is a natural incident of temperature changes) induce undue stresses on the various structural elements of the shielding window 11. It previously has been the practice to vent such an expansion chamber as expansion tank 44 to atmosphere. In the embodiment of this invention the air in the expansion tank above the level of the zinc bromide solution therein is replaced with an inert gas such as argon. Stopcocks 46 and 47 are present for the purpose of enabling expansion tank 44 to be purged of its air which can then be replaced with the argon gas. By so doing, the zinc bromide solution of the radiation-shielding window 11 is placed under an argon atmosphere, instead of the conventional air atmosphere. It has been discovered by this inventor that this replacement of the air atmosphere by an inert gas atmosphere such as an argon atmosphere, for example, prevents that discoloring contamination of the zinc bromide solution which is traceable to the otherwise-present reaction between the zinc bromide solution and the metal enclosure therefor of the shielding window. Air oxidation evidently is a necessary factor to the contaminating interaction between the zinc bromide solution and the surrounding metal of the shielding window which previously materially destroyed the transparency of the zinc bromide solution. The placement of the zinc bromide solution under an inert gas atmosphere such as with argon, for example, instead of the previously employed air atmosphere precludes this contaminating action.

It might be parenthetically mentioned here that the zinc bromide solution of the radiation-shielding window is also susceptible to a discoloration due to reactions induced in said zinc bromide solution by the radiation to which it is exposed. However, this type of contamination has long been controlled by the addition to the zinc bromide solution of hydroxylamine hydrochloride. The mechanism of radiation-induced reactions in zinc bromide solution is unknown, but bromine ($Br_2$) is one of the end-products of these reactions and evidently is the agent causing the radiation-induced discoloration. Corrosion and color traceable to the bromine can be prevented by the addition of the hydroxylamine hydrochloride which acts as an inhibitor to the reaction involved.

Although the specification has dealt specifically with the inert gas argon it must be realized that any other of the inert gases can be employed for the purpose of replacing the oxygen-carrying air atmosphere.

Another parenthetical note is that the above discussion has been with respect to the contamination to the zinc bromide solution in terms of the incapacitating effect it has upon the required transparency of the zinc bromide solution. The biological shielding characteristic of the zinc bromide solution is not affected by the contamination discussed.

Obviously many modifications and variations of the present invention are possible in the light of the above teachings. It is intended to cover all changes and modifications of the embodiment set forth herein which do not constitute departures from the spirit and scope of the invention.

What is claimed is:

1. A transparent radiation-shielding window adapted to complementarily fit in the opening of the wall of a hot cell containing radioactive material and to permit visual observation into said hot cell while biologically shielding the observer from the radiation present in said hot cell, which comprises:
    (a) a fluid-tight container adapted to contain a liquid, said container comprising at two opposite ends thereof a pair of spaced sheets of transparent material, said respective sheets defining a field of vision through said container;
    (b) a transparent radiation-absorbing liquid completely filling said container for excluding air therefrom; and
    (c) a fluid expansion means disposed exteriorly of the container and in fluid communication with said container fluid for relieving fluid pressure on said container sheets,
    (d) said container fluid partially filling said expansion means, and
    (e) gas inlet and outlet means for said expansion means, said inlet means being disposed below the liquid level of the expansion means whereby a chemically-inert gas can be introduced into the expansion means for placing and maintaining the liquid within said expansion means under a chemically-inert gas atmosphere.

2. The transparent radiation-shielding window of claim 1 wherein said radiation-absorbing liquid is a zinc bromide solution and wherein said chemically-inert gas atmosphere is composed of argon.

References Cited by the Examiner

UNITED STATES PATENTS 3,045,120  7/1962  Ohrn _____ 250—108

OTHER REFERENCES

Radiation Shielding by Price et al.: Pergamon Press, 1957, pp. 319–321.

RALPH G. NILSON, *Primary Examiner.*

JAMES W. LAWRENCE, *Examiner.*

S. ELBAUM, *Assistant Examiner.*